(12) United States Patent  
Lorek et al.

(10) Patent No.: US 8,018,971 B2
(45) Date of Patent: *Sep. 13, 2011

(54) SYSTEM AND METHOD FOR INSERTION OF TIME STAMP INTO REAL TIME DATA WITHIN A COMMUNICATIONS NETWORK

(75) Inventors: John Lorek, Snellville, GA (US); David R. Dworkin, Alpharetta, GA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/650,178

(22) Filed: Dec. 30, 2009

(65) Prior Publication Data

US 2010/0103921 A1 Apr. 29, 2010

Related U.S. Application Data

(63) Continuation of application No. 11/785,019, filed on Apr. 13, 2007, now Pat. No. 7,643,465, which is a continuation of application No. 10/283,090, filed on Oct. 30, 2002, now Pat. No. 7,206,327.

(60) Provisional application No. 60/380,830, filed on May 17, 2002.

(51) Int. Cl.
*H04J 3/06* (2006.01)

(52) U.S. Cl. .......................... 370/503; 370/470; 370/537

(58) Field of Classification Search .................. 370/350, 370/503–510

See application file for complete search history.

(56) References Cited

U.S. PATENT DOCUMENTS

| 5,331,318 | A | 7/1994 | Montgomery |
| 6,449,291 | B1 | 9/2002 | Burns et al. |
| 6,526,070 | B1 | 2/2003 | Bernath et al. |
| 6,650,624 | B1 | 11/2003 | Quigley et al. |
| 6,760,316 | B1 | 7/2004 | Hebsgaard et al. |
| 7,570,642 | B2 * | 8/2009 | Lavigne et al. ............... 370/392 |

OTHER PUBLICATIONS

SP-RFI-104-980724, Data-Over-Cable Service Interface Specifications, CableLabs, 208 pages, Jul. 1998.

* cited by examiner

*Primary Examiner* — Frank Duong
(74) *Attorney, Agent, or Firm* — Sterne, Kessler, Goldstein & Fox P.L.L.C.

(57) ABSTRACT

A system for adding a time stamp to transmission traffic on a wireless network comprises a front end processor that receives a packet from the network and generates a Start Of Frame pulse and a LENGTH field corresponding to a length of the packet. A time stamp generator generates a time stamp by sampling the system master time counter. A synchronizer receives the SOF pulse and the LENGTH field from the front end processor, and generates a control signal. A multiplexer inputs the packet from the front end processor, the control signal and the time stamp, and outputs a modified packet with a field in the packet replaced by the time stamp.

18 Claims, 2 Drawing Sheets

SYSTEM AND METHOD FOR INSERTION OF TIME STAMP INTO REAL TIME DATA WITHIN A COMMUNICATIONS NETWORK

CROSS-REFERENCE TO RELATED APPLICATIONS

This application is a continuation of U.S. patent application Ser. No. 11/785,019, filed on Apr. 13, 2007, entitled "Method for Insertion of Time Stamp into Real Time Data Within a Wireless Communications Network", which in turn is a continuation of U.S. patent application Ser. No. 10/283, 090 ("'090 application"), filed on Oct. 30, 2002, entitled "Method and Circuit for Insertion of Time Stamp into Real Time Data," all of which are incorporated herein by reference.

The '090 application in turn claims priority to U.S. Provisional Patent Application No. 60/380,830, filed on May 17, 2002, entitled "Method and Circuit for Insertion of Time Stamp into Real Time Data," which is incorporated herein by reference.

BACKGROUND OF THE INVENTION

1. Field of the Invention

The present invention relates to monitoring of data in a two-way communications system, and more particularly, to monitoring of transmissions using a time stamp.

2. Background Art

In a DOCSIS (Data Over Cable Service Interface Specification) 1.1 or 2.0 system (published by Cable Labs, Inc., and which is incorporated by reference herein), downstream data is continuous and of uniform pipeline delay between a cable modem termination system (CMTS) output process blocks and a cable modem (CM) input processing blocks. It is in this region of uniform pipeline delay where the CMTS inserts SYNC messages and the CM extracts SYNC messages. Specifically, outside the region of uniform pipeline delay, there are many applications where storing transmission data for later processing can be useful, provided there is information available about the time of the transmission, i.e., a timestamp associated with the data.

BRIEF SUMMARY OF THE INVENTION

The present invention is directed to a method and apparatus for marking a datum transmission with a time-stamp or time-code while in a real-time fixed pipeline delay process, prior to the datum being moved to a non-real time process.

There is provided a system for adding a time stamp to transmission traffic including a front end processor that receives a packet and generates a start of frame (SOF) pulse and a LENGTH field that corresponds to a length of the packet. A time stamp generator generates a time stamp. A synchronizer receives the LENGTH field and the SOF pulse from the front end processor and generates a control signal. A multiplexer inputs the packet from the front end processor, the control signal and the time stamp, and outputs a modified packet with a field in the packet replaced by the time stamp.

In another aspect there is provided a method of time stamping transmission traffic including the steps of receiving a packet from a network, generating a real-time timestamp, generating a Start Of Frame signal and a control signal, and outputting a modified packet with a field in the packet replaced by the real-time timestamp in response to the control signal and the Start Of Frame signal.

Additional features and advantages of the invention will be set forth in the description which follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Figure 1:
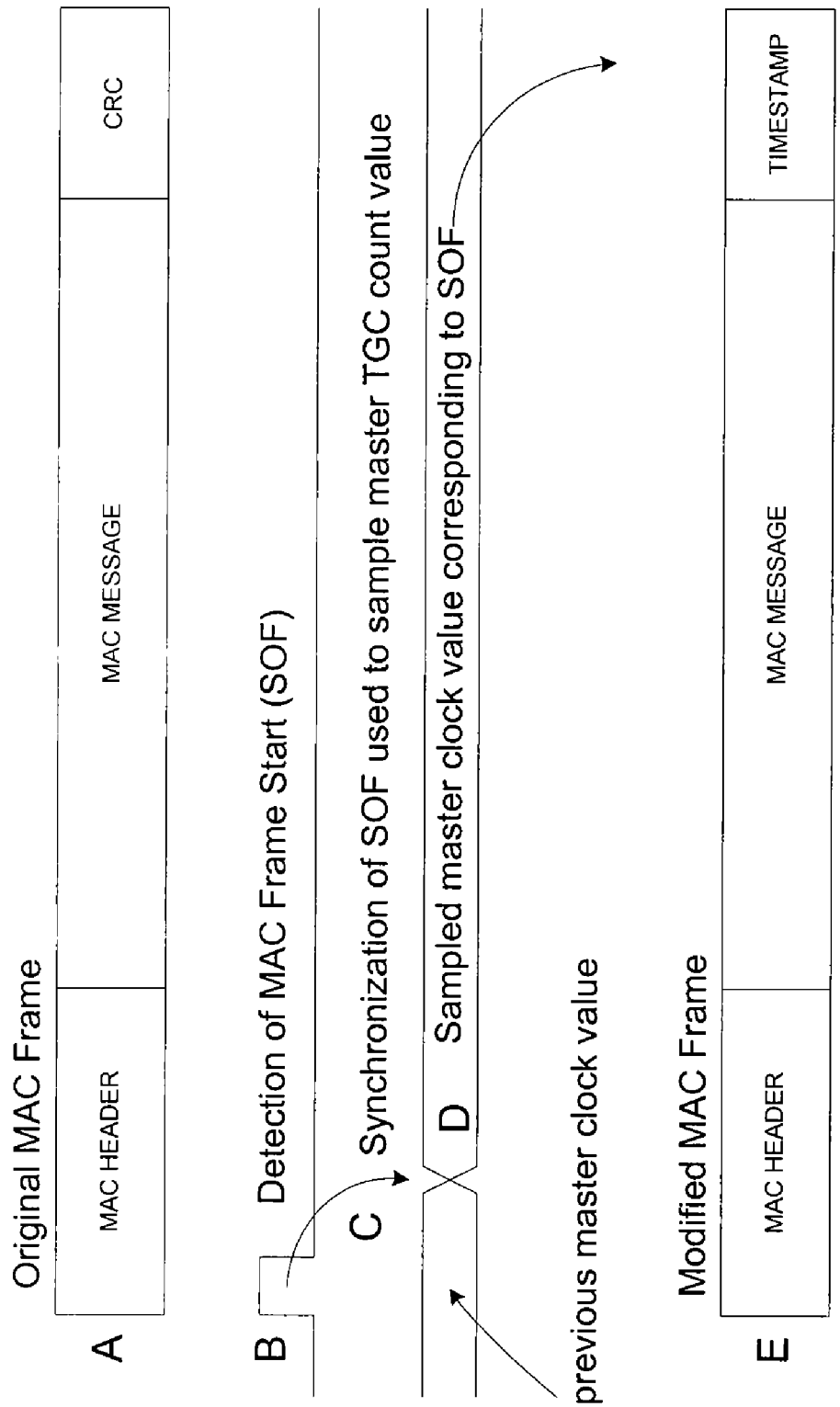
FIG. 1 illustrates a data format diagram of the present invention.

Reference will now be made in detail to the preferred embodiments of the present invention, examples of which are illustrated in the accompanying drawings.

A system for adding a timestamp to transmission traffic on a network comprises a front end processor that receives a packet from the network. The front end processor generates a start of frame (SOF) pulse coincident with the packet arrival time at the front end processor. The SOF pulse is synchronized to the system master clock and a sample of the system master clock is taken and held in a register. The SOF pulse is also used to start a parsing machine which reads the LENGTH field of the packet and computes the position of the packet CRC (cyclic redundancy check) field. At the time the CRC field is reached in the process chain, the CRC is replaced with the Time Stamp value held in the storage register. A multiplexer inputs the packet from the front end processor, the control signal (as discussed below) and the time stamp, and outputs a modified packet with a field in the packet replaced by the time stamp.

A system for adding a time stamp to transmission traffic on a network comprises a front end processor that receives a packet from the network. A timing recover counter keeps track of time in a receiving system (CM). The counter is kept in synchronization with a head end through the use of DOCSIS time SYNC messages. The SYNC messages are received periodically by the receiving system (CM) and used to adjust and maintain the receiving system's sense of real time. A time stamp generator generates a real-time time stamp by sampling the system time counter at a time coincident with a datum packet arrival into the front end of the CM real time front end processor block. The front end process block generates a Start Of Frame signal coincident with a datum packet arrival. A synchronizer uses the SOF pulse to take a snapshot of the system time reference called a time stamp, and generates a control signal. A multiplexer inputs the packet from the front end processor, the control signal and the real-time time stamp and outputs a modified packet with a field in the packet replaced by the real-time time stamp.

A real-time processor is used to sample an actual 4-byte time counter, or TGC timestamp count (or value) at the precise time a packet (e.g., a MAC frame) arrives at the frame parsing engine of the cable mode (CM) logic. (The standard format of a frame is provided in the DOCSIS specification, as will be readily apparent to one skilled in the art.) This actual 4 byte timestamp (TGC count) value, sampled (obtained) at a MAC frame arrival, is substituted into the 4 byte cyclic redundancy check (CRC) field of the same MAC frame. The presumption is that the CRC has already been used (either evaluated to be good, or not evaluated and ignored) and is no longer needed in the data processing chain. Once the CRC is no longer needed, the 4-byte field occupied by the CRC is useful for the purpose of substituting a 4 byte timestamp in its place.

Use of the DOCSIS SYNC message allows for the "real-time" properties and features of the DOCSIS system to function correctly. Use of timestamps and timestamp snapshots allows the user to configure timing references for real time processing of data with a precision of tens of nano-seconds and pico-seconds, respectively. Alternatively, if it is desired to post-process protocol data unit (PDU) or MESSAGE data without regard to when the data actually arrives, then it becomes necessary to tag each individual data packet, or MAC frame, with the actual arrival time of that particular MAC frame. The arrival time would typically be the 4-byte timestamp (TGC value) present in the system master clock at the time the MAC frame is presented to the first data processing block in the CM.

FIG. 1, element A illustrates a frame, such as a MAC frame, that includes payload (MAC message) and overhead (MAC header or CRC). When the frame (or packet) is received, a Start Of Frame signal is generated, see step in FIG. 1. After generation of the Start Of Frame signal, it is synchronized to the master clock domain, and is used to sample a master clock count, i.e., the TGC count.

A register is updated with a new TGC count such that it corresponds to the MAC frame Start Of Frame (SOF) signal. A modified MAC frame (or packet) is then generated, such that the CRC portion is replaced with a timestamp. Conveniently, the CRC portion of the MAC frame is a 4-byte long field. Thus, a 4-byte long timestamp fits exactly within the CRC field. Note that once the frame is received and processed, the CRC field is no longer necessary, and is in a sense redundant overhead from that point forward. Thus, it is a good candidate as the place to locate the real time timestamp.

Thus, as FIG. 1 illustrates:
At step A, original MAC frame (message or PDU) has a MAC Header, message body (PDU body) and CRC error correction field, (e.g., a word).
At step B, the start of the Mac frame (SOF) is detected.
At step C, the SOF is synchronized into the master clock domain and used to sample the master clock count (TGC count).
At step D, a holding register (not shown in the figures) is updated with the new TGC count which corresponds to the MAC frame SOF.
At step E, the original MAC frame, processed in real time has the 4 byte CRC replaced with the 4 byte TGC count sample.

Note further that there are other fields in the frame (packet) that may be used as a place to store the timestamp. For example, the header checksum field, which is 2-bytes, can also be used, if a reduction in timestamp resolution is acceptable (since the field is only 2-bytes long). Other fields may also be used, to the extent that at a particular point in the processing, their content is no longer necessary and represents redundant overhead. For example, the source and destination address fields in the header can be used as a place to put the time stamp, particularly the destination field. Furthermore, the DOCSIS standard reserves some fields. These reserved fields can also be used as the place to locate the real time timestamp. Note that, advantageously, the length of the entire frame (packet) does not change, and therefore, no additional steps are required to manipulate frames whose length does not match the length of the received frame.

It is preferred that the data (payload) portion is not altered by the addition of the timestamp, therefore, the use of overhead fields that are no longer necessary at a particular point in a processing is preferred.

Figure 2:
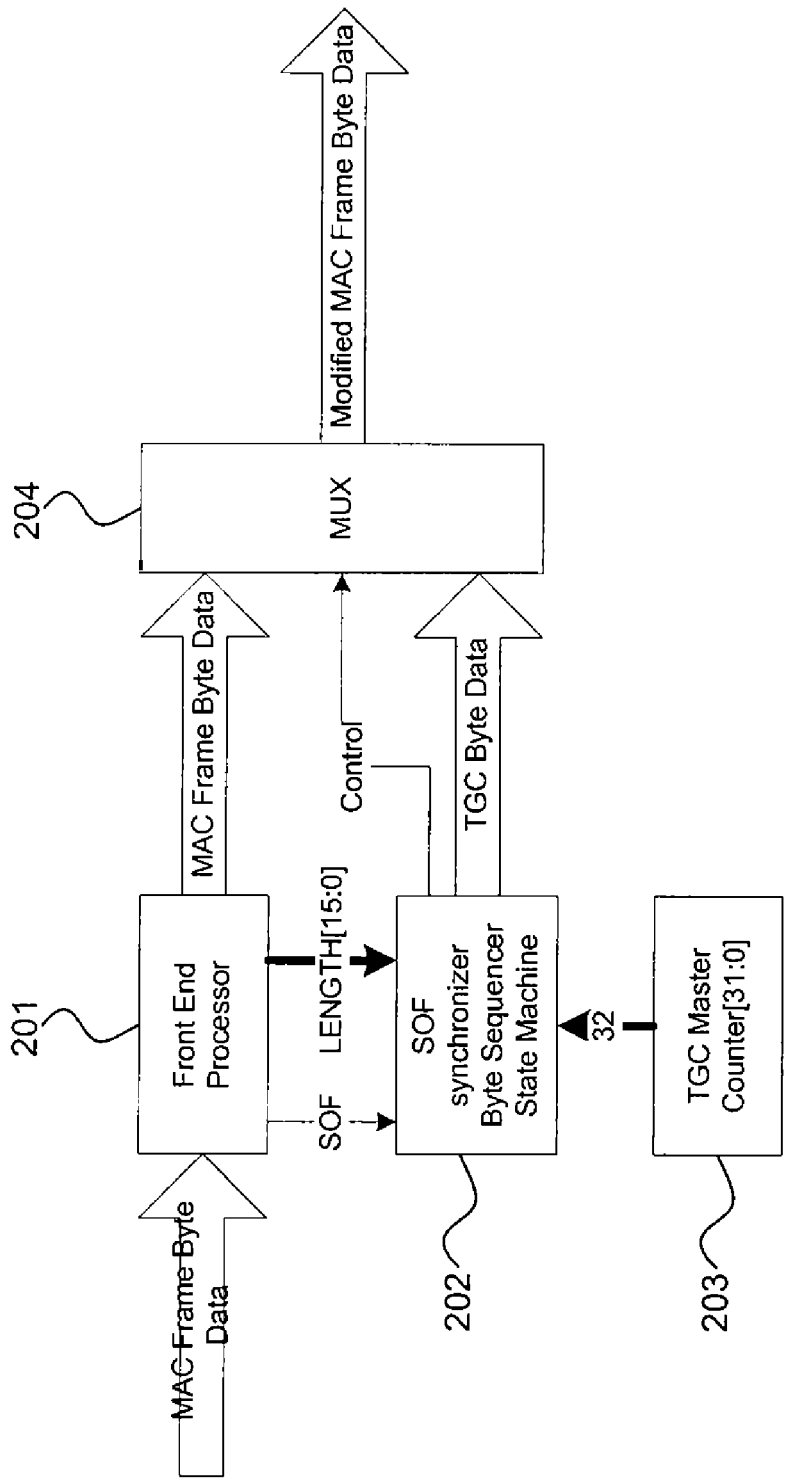
FIG. 2 illustrates a system block diagram of the present invention.

FIG. 2 shows a system block diagram of one embodiment of the present invention. As shown in FIG. 2, a frame (e.g., frame byte data) is received by a front end processor 201. The front end processor 201 generates a Start Of Frame (SOF) signal and outputs it to a Start Of Frame synchronizer 202. The front end processor 201 also outputs a LENGTH of packet signal to the Start Of Frame synchronizer, the LENGTH of packet corresponding to the LENGTH of the packet, in bytes.

The Start Of Frame synchronizer 202 also inputs a 32-bit TGC master counter output 203, which corresponds to a 4-byte timestamp. The Start Of Frame synchronizer 202 outputs a control signal and a TGC byte data signal to a multiplexer 204. The multiplexer 204 outputs a modified frame, such that the modified frame now includes the timestamp.

Note that the system shown in FIG. 2 can itself function as a headend in a cable modem termination system, or it can function simply as a monitor to analyze communications traffic on a network, and assist the end user in, for example, analyzing any transmission abnormalities, network errors, abnormalities, glitches, etc. The system shown in FIG. 2 can also function as a "portable" head end, that a technician in the field can set up in order to test the properties of the communication system.

Thus, as shown in FIG. 2:
The Original MAC frame (Message or PDU) has a MAC Header, message body (PDU body) and CRC error correction word. The start of the MAC frame is detected, and the LENGTH field is parsed. The SOF is synchronized into the master clock domain and used to sample the master clock count (TGC count). The TGC count is stored in a holding register. In addition, the LENGTH field is decremented, until the place where the CRC is located is reached. At this point the byte sequencer takes the TGC value contained in the holding register and sequences it byte by byte to the multiplexer 204. Control passes to the multiplexer 204 to select the TGC value at the time the CRC would normally be present. The TGC master counter is free-running as it normally does in the receiving system. Finally, the original MAC frame, processed in real time has the 4 byte CRC replaced with the 4 byte TGC count sample.

Thus, a timestamp value can be provided in the unused CRC field of each MAC frame, thereby keeping bandwidth efficiency unchanged and providing the needed arrival time information for each MAC frame processed.

Data may be processed byte-wide through a processing channel and then a function of the data, or a destination of the data is determined. The data is marked or stamped with the arrival time into the processor and then sent via direct memory access into system core memory. Once in the memory, the data can be processed. Since the arrival time of the data relative to the real-time count of the system clock is known, the destination or function of the data can be determined in a non-real-time software environment.

The method and circuit used to implement this functional improvement includes at least 4 functional areas:
Detect start of MAC frame.
Synchronize start and sample system master clock (TGC counter) at a time relative to the start of the MAC frame.
Compute, based on LENGTH field, the location of the CRC value.
Insert 4 byte Timestamp value into the CRC field, which contains the now obsolete (post-processed) CRC value.

This approach allows the user (or a testing/verification system) to mark DOCSIS MAC frames with the arrival times of the MAC frames into the processing channel for the purpose of post-processing the MAC frames. It therefore offers the advantage of being able to run non-real-time processing and calculations on the data (i.e., upstream channel descriptor (UCD) updates, bandwidth allocation map (MAP) allocation start time re-computations, Time Division Multiple Access (TDMA) mini-slot count and frame count value changes, etc.) while retaining the real-time property of knowing the actual time of MAC frames arrival. This has particular advantages in a product such as a cable transmission monitoring/analysis system, as most calculations will be done in software and there is a need to know the data's function relative to its arrival time.

It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A system for adding a time stamp to transmission traffic comprising:
    a front end processor that receives a packet and generates a start of frame (SOF) pulse and a length field that corresponds to a length of the packet;
    a time stamp generator that generates a time stamp;
    a synchronizer that receives the length field and the SOF pulse from the front end processor and generates a control signal; and
    a multiplexer that inputs the packet from the front end processor, the control signal and the time stamp, and outputs a modified packet with a field in the packet replaced by the time stamp,
    wherein the front end processor is configured to analyze the transmission traffic based at least in part on the time stamp.

2. The system of claim 1, wherein a length of the modified packet is the same as the length of the packet.

3. The system of claim 1, wherein the field in the packet is a cyclic redundancy check field.

4. The system of claim 1, wherein the field in the packet is a checksum field.

5. The system of claim 1, wherein the field in the packet is a destination address field.

6. The system of claim 1, wherein the field in the packet is a source address field.

7. The system of claim 1, wherein the field in the packet is four bytes long.

8. The system of claim 1, wherein the field in the packet is two bytes long.

9. The system of claim 1, wherein the timestamp is four bytes long.

10. The system of claim 1, further including a memory for storing the modified packet.

11. The system of claim 1, wherein the packet is a MAC (Media Access Controller) frame.

12. The system of claim 1, wherein the front end processor is further configured to analyze the transmission traffic for at least one of transmission abnormalities, network errors, abnormalities and glitches based at least in part on the time stamp.

13. A method of time stamping transmission traffic within a communications network comprising the steps of:
    receiving, by a front end processor, a packet from the communications network;
    generating, by a timestamp generator, a real-time timestamp;
    generating, by the front end processor, a Start of Frame signal and a length field, wherein the length field corresponds to the length of the packet;
    generating, by a synchronizer, a control signal in response to the length field and the Start of Frame signal;
    outputting, by a multiplexer, a modified packet in response to the control signal and the real-time timestamp, wherein a field in the packet is replaced by the real-time timestamp in response to the control signal and the Start of Frame signal; and
    analyzing the transmission traffic based at least in part on the real-time timestamp.

14. The method of claim 13, wherein the field in the packet is a cyclic redundancy check field.

15. The method of claim 13, wherein the field in the packet is a checksum field.

16. The method of claim 13, wherein the field in the packet is a destination address field.

17. The method of claim 13, wherein the field in the packet is a source address field.

18. The method of claim 13, wherein the analyzing the transmission traffic includes analyzing the transmission traffic for at least one of transmission abnormalities, network errors, abnormalities and glitches based at least in part on the real-time timestamp.

* * * * *